United States Patent [19]

Schneidermesser

[11] Patent Number: 5,676,260

[45] Date of Patent: Oct. 14, 1997

[54] VIDEO CASSETTE STORAGE RACK ARRANGEMENT

[76] Inventor: Ken Schneidermesser, 88-11 Ditiyas Ave., Brooklyn, N.Y. 11236

[21] Appl. No.: 492,985

[22] Filed: Jun. 21, 1995

[51] Int. Cl.$^6$ ............................................. A47F 7/00
[52] U.S. Cl. ........................... 211/41; 211/40; D6/407
[58] Field of Search ..................... 211/40, 41, 194; D6/407, 450, 453

[56] References Cited

U.S. PATENT DOCUMENTS

| | | | |
|---|---|---|---|
| D. 136,257 | 8/1943 | Lachman | D6/453 |
| D. 328,994 | 9/1992 | Jurgens | D6/450 |
| D. 333,225 | 2/1993 | Robinson | D6/450 X |
| D. 359,647 | 6/1995 | Dardashti | D6/407 X |
| D. 361,917 | 9/1995 | Dardashti | D6/407 X |
| D. 370,377 | 6/1996 | Hsu | D6/407 X |
| 4,356,928 | 11/1982 | Stafford | 220/263 |
| 4,372,077 | 2/1983 | Balbuena | 46/116 |
| 4,874,340 | 10/1989 | Smallwood | 446/28 |
| 4,878,871 | 11/1989 | Noto | 446/302 |
| 4,993,558 | 2/1991 | Assael | 211/40 |
| 5,059,149 | 10/1991 | Stone | 446/73 |
| 5,094,645 | 3/1992 | Stern et al. | 446/370 |
| 5,341,943 | 8/1994 | Fraser | 211/40 |

OTHER PUBLICATIONS

Home Decorator Collection catalog, Sep. 15, 1992, p. 23, "L. CD Tower".

*Primary Examiner*—Robert W. Gibson, Jr.
*Attorney, Agent, or Firm*—Levisohn, Lerner, Berger & Langsam

[57] ABSTRACT

A storage arrangement for storing a plurality of video cassettes includes a storage rack and a physical object of an appealing appearance for holding the storage rack in an upright position in which it is capable of holding the cassettes at spaced locations for individual cassette removal and insertion. The physical object includes a base portion for supporting the object on any substantially horizontal surface, a superstructure secured to the base portion and extending upwardly from the base portion in a use position of the object, and elastically yieldable connecting portions engaging the storage rack to hold it in its upright position when the object is in its use position.

14 Claims, 1 Drawing Sheet

VIDEO CASSETTE STORAGE RACK ARRANGEMENT

FIELD OF THE INVENTION

The present invention relates to storage devices for storing physical objects, and more particularly to storage racks for accommodating a plurality of cassettes, especially video cassettes, in a stacked relationship.

BACKGROUND OF THE INVENTION

Many types of physical object storage devices are already known, among them those constructed to accommodate and separately support a plurality of identically shaped objects, such as audio or video cassettes, computer diskettes, compact disks, laser disks or similar information storage media, in an organized fashion, especially in a stacked relationship. Typically, storage devices of this kind are configured as boxes or racks that may either be provided with respective lids, doors or similar transparent or opaque, sometimes lockable, closures providing protection for the items being stored, or be open for good contents visibility and easy access. In most cases, such storage devices are provided with support arrangements that, in effect if not in fact, define a plurality of separate compartments, each for accommodating any one of the identically shaped objects chosen by the device user and keeping such object in place and accessible for removal regardless of the status (empty or occupied) of any other compartment. This enables the user to remove any of the stored objects of his or her choice from the storage device, and subsequently to insert the same or a different object into the same or a different empty compartment, without disturbing any other stored object. All that is needed to achieve this independent object insertion and withdrawal capability is that the support means provide at least a three-point contact with each of the objects. Consequently, while the support means may include solid partitioning walls delimiting the separate compartments, it is often constituted merely by support ribs or rails or other similar protrusions or structures that are disposed relative to one another such as to provide the requisite three-point engagement with the respective object.

For cost, space utilization, weight and/or other similar reasons, it is currently customary to give the storage devices of the above type configurations and/or appearances that are, by and large, utilitarian. So, for instance, as far as open storage racks are concerned, they often include just the bare essentials. Such a minirealistic storage rack construction may include, for instance, a generally open outer frame having transversely spaced lateral guidance portions that carry insertion-limiting abutments, as well as the aforementioned support structures that may include generally transversely extending rigid strips connected with the lateral guidance portions and extending between them along courses that cooperate with one another or with other support portions or elements to support the object, such as a video cassette, inserted into the space or compartment delimited by such strips.

Unlike most storage boxes, storage racks are intended for use in their upright positions, that is, with individual storage compartments being situated one above the other. This means that when the storage rack is constructed to have, as usually desired, a meaningful storage capacity (more than just three or four video cassettes or the like), it will have inherent stability problems attributable to the fact that, in use, the vertical dimension of the storage rack by far exceeds its horizontal dimension. To take care of this problem, such a storage rack is usually equipped with or mounted in a non-tiltable manner on an enlarged base that, because of its relatively large horizontal dimensions, prevents the rack proper from toppling over, except in extreme circumstances. Obviously, the need for providing such a base and the means for connecting the same with the rack proper increases the complexity and hence the cost of the storage rack arrangement, usually without contributing to customer appeal.

Moreover, recent developments in the home entertainment field, particularly the increased availability and dramatically reduced cost of prerecorded video cassettes, had made it feasible for a large segment of society to establish video cassette libraries of selected titles not only for adults, but for children as well. While the utilitarian approach to the video cassette storage box or rack construction may be acceptable to or even preferred by adults for their own video tape libraries, it leaves much to be desired as far as children's collections are concerned. For one, articles exhibiting purely utilitarian configurations are rarely if ever appealing to children (not to speak about their parents). Moreover, and probably more importantly, the utilitarian storage rack construction, with its many exposed corners or edges, may raise safety concerns where children are the intended ultimate users of the storage racks. Hence, such bare-bone storage racks articles are less likely to be purchased and/or used for their intended purpose than more elaborate or more aesthetically pleasing or emotionally attractive articles of the same type.

OBJECTS OF THE INVENTION

Accordingly, it is an object of the present invention to avoid the disadvantages of the prior art.

More particularly, it is an object of the present invention to provide a storage arrangement, especially for storing a plurality of video cassettes in a stacked relationship, which storage arrangement does not have the drawbacks of similar or comparable prior art storage arrangements.

Still another object of the present invention is to construct the storage arrangement of the type under consideration here in such a manner as to make it attractive not only for purchase but also, and especially, for utilization on premises set aside indoors for use by children.

It is yet another object of the invention to design the storage arrangement such as to alleviate if not eliminate all child safety concerns with respect thereto.

A concomitant object of the present invention is to devise a storage arrangement of the above type that is relatively simple in construction, inexpensive to manufacture, easy to use, and reliable in operation.

SUMMARY OF THE INVENTION

In keeping with these objects and others that will become apparent hereafter, one feature of the present invention resides in a storage arrangement for storing a plurality of video cassettes in an individually accessible vertically stacked relationship, including a storage rack having a height dimension substantially exceeding all other dimensions and including means for individually removably supporting the cassettes at mutually spaced locations in the stacked relationship, at least when the storage rack assumes an upright position in which the height dimension thereof extends along a substantially vertical course. The storage arrangement further includes means for holding the storage rack in the upright position, such holding means including, according to the invention, a physical object of an appearance appealing to children. Such an object includes a base portion for supporting the object in a use position thereof on any substantially horizontal surface, a superstructure secured to the base portion and extending upwardly therefrom in the use position, and connecting means secured at least to the superstructure and engaging the storage rack to hold the same in the upright, possibly slightly reclining, position when the object is in the use position thereof, with unobstructed ingress into and egress from the spaced locations. The connecting means are advantageously elastically yieldable to provide for easy and yet secure engagement with the storage rack.

A particular advantage of the storage arrangement of the present invention as described so far is that the cassette accommodation locations are fully and directly accessible at all times, even though the storage rack is mounted on the object and some portions of the storage rack are covered up or obscured by the connecting means. Other advantages are that the object not only confers a pleasing appearance on the entire storage arrangement, but also protects the user, typically a child, from coming into contact with any sharp edges or corners of the storage rack, which is typically constructed of metal. Taken together, these features make the storage arrangement of the invention an attractive candidate for use not only in a home environment, but also in commercial establishments, for instance, for drawing attention to and/or promoting the sale of cassettes displayed therein.

A particularly advantageous construction of the storage arrangement is obtained when the object includes a yieldable outer envelope and a yieldable filling that substantially fills the envelope, and especially when the object is constituted by a plush toy, especially a stuffed animal toy. Under these circumstances, it is of advantage when the object further includes a reinforcing member, which may be of a substantially plate-shaped configuration, disposed between the filing and the outer envelope in juxtaposition with at least a portion of the storage rack, inasmuch as the presence of the reinforcing member within the otherwise yieldable object improves the stability of the object and of the manner in which the storage rack is held on the object. Yet, such a reinforcing member may have at least a limited flexibility, for instance as a result of being made of cardboard, to be able to accommodate itself to the overall shape of the object, on the one hand, and that of the storage rack, on the other hand.

According to another aspect of the present invention, the connecting means includes connecting portions that bound a pocket secured to the object for receiving a lower region of the storage rack, and at least one additional connecting portion engaging the storage rack at a location remote from the lower region thereof. Generally speaking, though, it is also contemplated within the framework of the present invention for the connecting means to include a plurality of connecting portions that engage the storage rack at the lower region thereof and at least at one location remote from the lower region. In this context, it is especially advantageous when the connecting means includes relatively soft connecting portions wrapped around respective exposed marginal zones of the storage rack to engage adjacent retaining portions of the rack that advantageously diverge from one another as considered in a direction toward the object when the storage rack is mounted thereon.

The novel features which are considered as characteristic of the invention are set forth in particular in the appended claims. The improved cassette storage arrangement itself, however, both as to its construction and the manner in which it is used, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
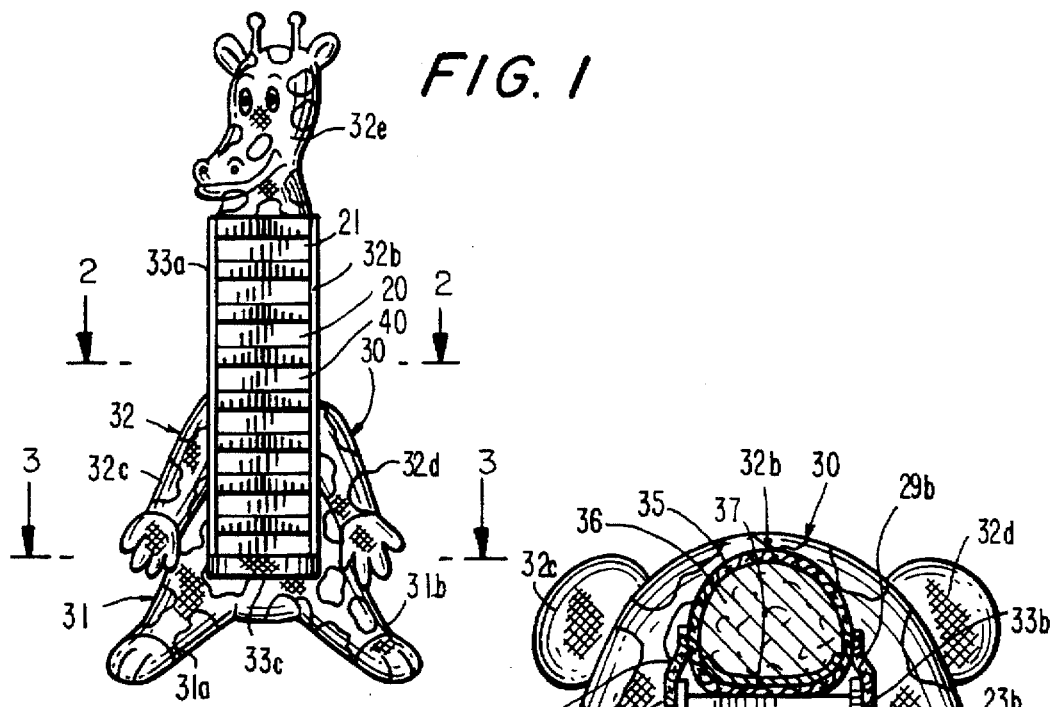
FIG. 1 is a front elevational view of an example of a cassette storage arrangement embodying the present invention.

Referring now to the drawing in detail, and first to FIG. 1 thereof, it may be seen that the reference numeral 10 has been used therein to identify an exemplary storage arrangement embodying the present invention. The storage arrangement 10 includes, as its main components, a storage rack 20 and a physical object 30 for supporting the storage rack 20 in its depicted upright position. The object 30 is shown to be configured as a stuffed animal toy, such as a giraffe. However, it is to be understood that this particular shape, as advantageous as it may be, is not critical; as a matter of fact, the object 30 can have any shape, color or other attributes, so long as its appearance is pleasing or attractive to potential purchasers and/or users, especially children. Thus, not only other animal shapes and depictions of other figures, be they real people of the present or past or fictional characters, but also imitations of inanimate objects, such as footballs or other game paraphernalia, may be used instead. What is important if not indispensable, though, is that the object 30 include at least a base portion 31 shaped to stably support the storage arrangement 10 in the illustrated use position on any substantially horizontal surface, such as the floor of indoor premises used or frequented by children, and a superstructure 32 that is of one piece with or otherwise secured to the base portion 31 to extend upwardly therefrom in the depicted use position. The superstructure 32 is constructed to essentially retain its position relative to the base portion 31 at least under normal load conditions, for instance, by being reinforced, such as in a manner that will be discussed later.

As illustrated, the base portion 31 is constituted by lower extremities 31a and 31b and/or adjacent bottom portions of the toy animal FIG. 30, and the superstructure 32 includes a rump or torso portion 32a and a neck portion 32b (see FIGS. 3 and 2, respectively) as well as upper extremities 32c and 32d attached to the rump portion 32a, and a head 32e carried by the neck portion 32b. The rump portion 32a and the neck portion 32b are shown to be substantially coextensive with the storage rack 20.

The depicted storage rack 20 is designed for separate accommodation of video cassettes, such as that indicated at 40, at any of vertically spaced or stacked locations 21 of the storage rack 20. The storage rack 20 is held on or attached to the object 30 by connecting means generally indicated at 33. The connecting means 33 includes respective holding or connecting portions, such as those denoted in FIG. 1 by reference numerals 33a, 33b and 33c, which are secured to the remainder of the object 30, that is at least to its superstructure 32, and are elastically yieldable to be able to engage the storage rack 20 in such a manner as to hold it in its illustrated upright position on the object 30, preferably for yielding out of the way when it is desired to disassemble the storage rack 20 from the object 30.

Figure 2:
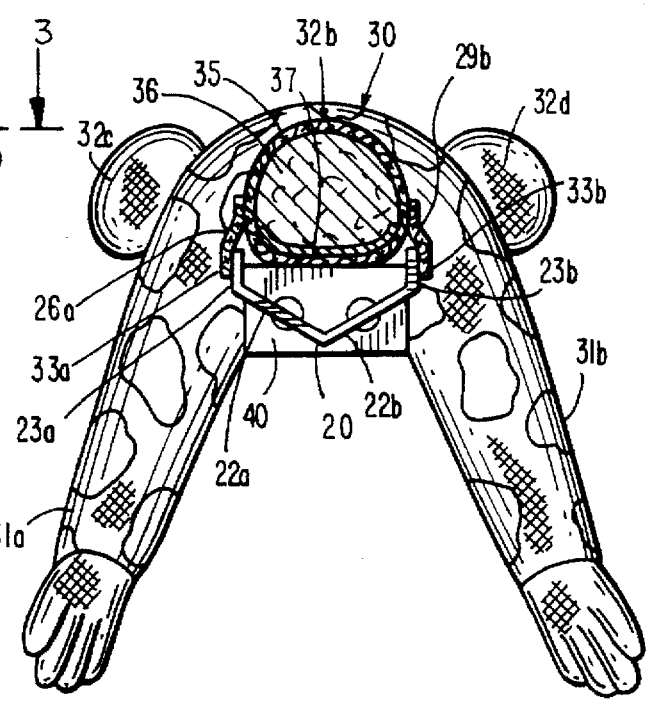
FIG. 2 is a cross-sectional view taken on line 2—2 of FIG. 1.

Turning now especially to FIG. 2 of the drawing, it may be seen there that the storage rack 20 includes supporting portions 22a and 22b that diverge from one another in a V-shaped fashion with a large obtuse angle being included between them and that, besides delimiting the respective location 21 (indicated in FIG. 1) from below and a vertically adjacent one from above, serve to support the respective cassette 40 from below. Moreover, if need be, corresponding superposed support portions 22a and 22b will engage the same cassette 40 from above such that the latter will be, so to speak, wedged between such superposed support portions. It will be appreciated that the superposed support portions 22a and 22b delimit a slot that at least partially constitutes the respective storage location 21.

Moreover, even though not visible in the various drawing views, it is especially useful for the storage rack 20 to have a slightly reclining or recumbent orientation, say 5° from the vertical, toward the superstructure 32 as considered from down to up. This results in a situation where the respective cassette 40 will have a tendency to move deeper into, rather than out of, the respective slot forming the entrance to the associated storage location 21 when the storage arrangement 10 is subjected to vibrations or even jolts. In any case, the cassette 40 is retained in the location 21 against accidental dislodgement.

The support portions 22a and 22b are adjoined by respective associated guiding portions 23a and 23b of the storage rack 20 which, for one, laterally delimit the respective location 21 and guide the respective cassette 40 during its introduction into or withdrawal from the respective location 21 through the associated slot. The guiding portions 23a and 23b are shown to slightly flare or diverge from one another as considered in a direction toward the object 30 in the illustrated assembled situation. As depicted in FIG. 2, the elastically yieldable connecting portions 33a and 33b of the object 30 engage such guiding portions 23a and 23b of the rack 20 from the outside, thus holding them and hence the entire storage rack 20 in position relative to the object 30 at least as far as relative movements in lateral or transverse directions are concerned. The flaring courses of the guiding portions 23a and 23b further improve such holding action by reducing the probability of slippage of the connecting portions 23a and 23b off the guiding portions or regions 33a and 33b.

The guiding portions 23a and 23b are adjoined, at their regions close to the object 30, by abutment portions 24a and 24b, respectively. Such abutment portions 24a and 24b provide abutment surfaces for delimiting the extent to which the respective cassette 40 can be inserted into the respective slot or location 21, unless such inserting movement is stopped by abutment of the cassette 40 against a region of the superstructure 32 before contact with such abutment surfaces. Moreover, at least one of the abutment portions 24a and 24b also abuts the respective neck portion 32b or rump portion 32a, thus positioning the storage rack 20 relative to the object and further reducing the possibility or extent of the aforementioned lateral movement.

Figure 3:
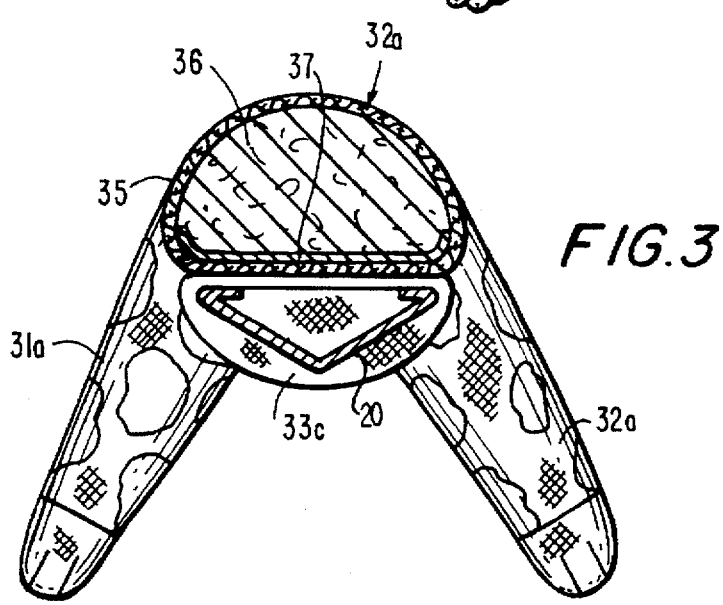
FIG. 3. is a view similar to that of FIG. 2 but taken on line 3—3 of FIG. 1.

As a comparison of FIGS. 1 and 3 of the drawing will reveal, a connecting portion 33c, which is located at the rump portion 32a of the object 30, is configured to form a pocket or pouch that receives a lower portion of the storage rack 20, thus preventing its movement in the downward direction, while gravity makes it unlikely that the storage rack 20 would move in the upward direction in the illustrated position of the arrangement 10, even if subjected to external forces. Yet, the possibility that such upward movement of the storage rack 20 relative to the object 30 would take place is further reduced by giving the head 32e such a configuration as to extend over the upper portion of the storage rack 20 and thus into the path of its possible upward movement. This expedient also makes it less likely that a child user of the storage arrangement 10 would come into contact with any relatively sharp edges or corners that may be present on the upper portion of the storage rack 20, while the connecting portions 33a, 33b and 33c perform a similar function with respect to any such edges or corners that may be present at the abutment portions 24a or 24b, or at the lower portion of the storage rack 20, respectively.

FIGS. 2 and 3 of the drawing also reveal that at least the rump and neck portions 32a and 32b of the object 30, but preferably the entire object 30, include an outer skin or envelope 35 and an inner filling 36, with the connecting portions 33a, 33b and 33c being connected, such as by sewing, to the skin 35. The skin may preferably be of a material, such as fabric, preferably such having a texture that is lush or an otherwise pleasant to touch texture, while the stuffing may be of a foamed or fibrous material, as is well known in connection with traditional stuffed animal figures. Moreover, a basically plate or sheet shaped, typically flexible, reinforcing member 37 is present between the stuffing or filling 36 and the outer skin 35 at least in juxtaposition with the storage rack 20, to provide an additional measure of stability.

It will be appreciated that the storage arrangement 10 of the above construction, besides constituting a rather appealing and attractive addition to any child's room, may also serve as an inducement to the child to stash in it the video cassettes that are not being used at that time, rather than having them strewn all over his or her room. Moreover, the storage arrangement 10 of the above construction may also be used to advantage in commercial display and/or promotional activities, especially by giving the arrangement 10 the appearance of a prominent character appearing in a movie contained on video cassettes then on sale.

While the invention has been illustrated and described as embodied in a particular implementation of the storage arrangement for use in storing video tapes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the contribution to the art and, therefore, such adaptations should and are intended to be comprehended within the meaning and range of equivalence of the claims.

What is claimed as new and desired to be protected by Letters Patent is set forth in the appended claims:

1. A storage arrangement for storing a plurality of video cassettes in an individually accessible vertically stacked relationship, comprising a storage rack having a height dimension and including means for individually removably supporting the cassettes, at least when said storage rack assumes an upright position in which said height dimension thereof extends along a substantially vertical course, at mutually spaced locations in the stacked relationship; and means for holding said storage rack in said upright position, including a physical object of an appearance appealing to children, including a base potion for supporting said object in a use position thereof on any substantially horizontal surface, a superstructure secured to said base potion and extending upwardly therefrom in said use position, and elastically yieldable connecting means secured at least to said superstructure and engaging said storage rack to hold the same in said upright position when said object is in said use position thereof, providing unobstructed ingress into and egress from said locations.

2. The storage arrangement as defined in claim 1, wherein said object includes a yieldable outer envelope and a yieldable filling that substantially fills said envelope.

3. The storage arrangement as defined in claim 2, wherein said object further includes a reinforcing member disposed between said filling and said outer envelope in juxtaposition with at least a portion of said storage rack.

4. The storage arrangement as defined in claim 3, wherein said reinforcing member has a substantially plate-shaped configuration.

5. The storage arrangement as defined in claim 3, wherein said reinforcing member has at least a limited flexibility.

6. The storage arrangement as defined in claim 5, wherein said reinforcing member is of cardboard.

7. The storage arrangement as defined in claim 1, wherein said storage rack has a lower region as considered in said upright position; and wherein said connecting means includes connecting portions that bound a pocket secured to said object for receiving said lower region of said storage rack, and at least one additional connecting portion engaging said storage rack at a location remote from said lower region thereof.

8. The storage arrangement as defined in claim 1, wherein said storage rack has a lower region as considered in said upright position; and wherein said connecting means includes a plurality of connecting portions that engage said storage rack at said lower region thereof and at least at one location remote from said lower region.

9. The storage arrangement as defined in claim 1, wherein said storage rack has retaining portions bounded by exposed marginal zones; and wherein said connecting means includes relatively soft connecting portions wrapped around said marginal zones to engage said retaining portions.

10. The storage arrangement as defined in claim 1, wherein said storage rack has lateral retaining portions as considered in said upright position that are bounded by exposed marginal zones and diverge from one another toward said marginal zones thereof; and wherein said connecting means includes relatively soft connecting portions wrapped around said marginal zones to engage said diverging retaining portions.

11. The storage arrangement as defined in claim 1, wherein said object is a stuffed animal.

12. The storage arrangement as defined in claim 1, wherein said object has such a configuration as to give said storage rack a reclining orientation in said upright position.

13. The storage arrangement as defined in claim 1, wherein said height dimension substantially exceeds all other dimensions of said storage rack.

14. A storage arrangement as claimed in claim 1 wherein said physical object is three-dimensional and non-planar.

* * * * *